US006953758B2

(12) United States Patent
Arbab et al.

(10) Patent No.: US 6,953,758 B2
(45) Date of Patent: Oct. 11, 2005

(54) LIMITED VISIBLE TRANSMISSION BLUE GLASSES

(75) Inventors: Mehran Arbab, Allison Park, PA (US); Larry J. Shelestak, Bairdford, PA (US); Dennis G. Smith, Butler, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 10/047,353

(22) Filed: Jan. 14, 2002

(65) Prior Publication Data

US 2002/0198094 A1 Dec. 26, 2002

Related U.S. Application Data

(63) Continuation-in-part of application No. 09/076,566, filed on May 12, 1998, now Pat. No. 6,656,862.

(51) Int. Cl.[7] ........ C03C 3/078
(52) U.S. Cl. ........ 501/70; 501/71
(58) Field of Search ........ 501/70, 71

(56) References Cited

U.S. PATENT DOCUMENTS

| | | | | |
|---|---|---|---|---|
| 3,300,323 A | | 1/1967 | Plumat et al. | 106/52 |
| 3,723,142 A | | 3/1973 | Kato et al. | 106/52 |
| 4,104,076 A | | 8/1978 | Pons | 106/52 |
| 4,292,372 A | | 9/1981 | Moynihan | 428/437 |
| 4,339,541 A | | 7/1982 | Dela Rue | 501/71 |
| 4,381,934 A | | 5/1983 | Kunkle et al. | 65/135 |
| 4,704,174 A | | 11/1987 | Valimont et al. | 156/101 |
| 4,792,536 A | | 12/1988 | Pecoraro et al. | 501/70 |
| 4,873,206 A | | 10/1989 | Jones | 501/71 |
| 4,886,539 A | | 12/1989 | Cerutti et al. | 65/135 |
| 5,023,210 A | | 6/1991 | Krumwiede et al. | 501/71 |
| 5,028,658 A | | 7/1991 | David et al. | 525/58 |
| 5,278,108 A | | 1/1994 | Cheng et al. | 501/71 |
| 5,308,805 A | | 5/1994 | Baker et al. | 501/71 |
| 5,346,867 A | | 9/1994 | Jones et al. | 501/71 |
| 5,352,640 A | | 10/1994 | Combes et al. | 501/71 |
| 5,380,685 A | | 1/1995 | Morimoto | 501/71 |
| 5,393,593 A | | 2/1995 | Gulotta et al. | 428/220 |
| 5,411,922 A | | 5/1995 | Jones | 501/71 |
| 5,478,783 A | | 12/1995 | Higby et al. | 501/27 |
| 5,521,128 A | | 5/1996 | Jones et al. | 501/27 |
| 5,545,596 A | | 8/1996 | Alvarez Casariego et al. | 501/71 |
| 5,582,455 A | | 12/1996 | Casariego et al. | 296/146.2 |
| 5,688,727 A | * | 11/1997 | Shelestak et al. | 501/71 |
| 5,698,053 A | | 12/1997 | Carroll et al. | 156/103 |
| 5,780,372 A | * | 7/1998 | Higby | 501/70 |
| 5,807,417 A | * | 9/1998 | Boulos et al. | 65/134.3 |
| 5,837,629 A | | 11/1998 | Combes et al. | 501/70 |
| 5,851,940 A | | 12/1998 | Boulos et al. | 501/71 |
| 5,994,249 A | * | 11/1999 | Graber et al. | 501/71 |
| 6,313,053 B1 | * | 11/2001 | Shelestak | 501/71 |

FOREIGN PATENT DOCUMENTS

| | | |
|---|---|---|
| CA | 2148954 | 11/1995 |
| EP | 0 452 207 | 10/1991 |
| EP | 0 482 535 | 4/1992 |
| EP | 0 536 049 | 4/1993 |
| EP | 0 705 800 | 4/1995 |
| EP | 0 677 492 | 10/1995 |
| EP | 0 768 284 | 4/1997 |
| EP | 0 825 156 | 2/1998 |
| EP | 0 887 320 | 12/1998 |
| EP | 1 132 350 | 9/2001 |
| FR | 2 331 527 | 7/1977 |
| GB | 1 331 492 | 9/1973 |
| GB | 2304709 | 3/1997 |
| GB | 2304711 | 3/1997 |
| JP | 6-503300 | 4/1994 |
| JP | 7-508971 | 10/1995 |
| JP | 8-165136 | 6/1996 |
| JP | 9-124341 | 5/1997 |
| WO | WO93/07095 | 4/1993 |
| WO | WO94/18135 | 8/1994 |
| WO | WO95/16641 | 6/1995 |
| WO | WO95/18075 | 7/1995 |
| WO | WO 96/00194 | 1/1996 |
| WO | WO 97/17303 | 5/1997 |
| WO | 99/05069 | 2/1999 |
| WO | 99/20577 | 4/1999 |
| WO | 99/58462 | 11/1999 |
| WO | WO00/73062 | 12/2000 |

OTHER PUBLICATIONS

U.S. Appl. No. 09/076,566, filed May 12, 1998.

International Search Report dated Sep. 1, 2003.

* cited by examiner

*Primary Examiner*—Karl Group
*Assistant Examiner*—Elizabeth A. Bolden
(74) *Attorney, Agent, or Firm*—Jacques B. Miles

(57) ABSTRACT

A blue colored, infrared and ultraviolet absorbing glass composition having a luminous transmittance of up to 60 percent can form transparent glass panel sets for mounting in automobiles. A non-limiting glass composition includes a standard soda-lime-silica glass base composition and a solar radiation absorbing and colorant portion having 0.9 to 2.0 percent by weight total iron, 0.15 to 0.65 percent by weight FeO, 90 to 250 PPM CoO, and optionally up to 12 PPM Se and up to 0.9 wt % $TiO_2$, and preferably 1 to 1.4 percent by weight total iron, 0.20 to 0.50 percent by weight FeO, 100 to 150 PPM CoO, up to 8 PPM Se, and up to 0.5 wt % $TiO_2$, at a thickness of 0.160 inches (4.06 millimeters) the glass has a dominant wavelength in the range of 480 to 489 nanometers and an excitation purity of at least 8 percent.

29 Claims, No Drawings

LIMITED VISIBLE TRANSMISSION BLUE GLASSES

This patent application is a continuation in part patent application of the patent application Ser. No. 09/076,566, filed 12 May 1998 now U.S. Pat. No. 6,656,862 and titled, "BLUE PRIVACY GLASS" which had a request for continuing examination filed on Apr. 24, 2001.

FIELD OF THE INVENTION

This invention relates to a blue colored soda-lime-silica glass having a limited luminous transmittance of less than 70 percent that makes it desirable for use as a medium luminous transmittance glazing in vehicles, such as the side, rear and back windows in automotive vehicles, trucks, vans, trains and other mass transportation vehicles and the like. As used herein, the term "blue colored" is meant to include glasses that have a dominant wavelength of 479 to 495 nanometers (nm.) and preferably 480 to 491 nm. and most preferably up to 489 nm. and may also be characterized as blue-green or blue-gray in color. Generally in the CIELAB color system which is described further infra blue gives a negative value for both a* and b*. In addition, the glass should exhibit comparable or lower infrared and ultraviolet radiation transmittance when compared to typical blue glasses used in automotive applications and be compatible with float glass manufacturing methods. Also this limited LTA glass is useful as the glass vision panels for side, rear, or back windows of motor vehicles in conjunction with glass with a similar blue color as transparent panels with a higher LTA and/or transparent privacy panels with a lower LTA for other locations in the motor vehicle as a vehicle panel set. Herein the term "transparent" means having a visible light transmittance of greater than 0% to be something other than "opaque" which has a visible light transmittance of 0%.

TECHNICAL SUBSTITUTIONS

Various dark tinted, infrared and ultraviolet radiation absorbing glass compositions are known in the art. The primary colorant in typical dark tinted automotive privacy glasses is iron, which is usually present in both the $Fe_2O_3$ and FeO forms. Some glasses use cobalt, selenium and, optionally, nickel in combination with iron to achieve a desired color and infrared and ultraviolet radiation, for example, as disclosed in U.S. Pat. No. 4,873,206 to Jones; 5,278,108 to Cheng, et al.; U.S, Pat. No. 5,308,805 to Baker, et al.; U.S. Pat. No. 5,393,593 to Gulotta, et al.; U.S. Pat. No. 5,545,596 and 5,582,455 to Casariego, et al.; and European Patent Application No. 0 705 800. Others also include chromium with this combination of colorants as disclosed in U.S. Pat. No. 4,104,076 to Pons; U.S. Pat. No. 4,339,541 to Dela Ruye; U.S. Pat. No. 5,023,210 to Krumwiede, et al.; and U.S. Pat. No. 5,352,640 to Combes, et al.; European Patent Application No. 0 536 049; French Patent No. 2,331, 527 and Canadian Patent No. 2,148,954. Patents such as U.S. Pat. Nos. 5,521,128 and 5,346,867 to Jones, et al. and U.S. Pat. No. 5,411,922 to Jones further includes manganese and/or titanium. Still, other glasses may include additional materials, such as disclosed in WO 96/00194, which teaches the inclusion of fluorine, zirconium, zinc, cerium, titanium and copper in the glass composition and requires that the sum of the alkaline earth oxides be less than 10 weight percent oft the glass.

Also blue glass compositions for not the darkest type of privacy glass glazing are known from U.S. Pat. No. 5,994, 249 (Graber et. al.) This soda-lime-silica glass has a visible light transmittance in the range of 35% to 75%. This glass composition has essential ingredients of about 0.5 to about 0.9 weight percent total iron as $Fe_2O_3$ and about 50 to 100 PPM CoO, and about 1.0 to about 2.0 weight percent $TiO_2$ with a ferrous iron to total iron ratio of about 20% to about 40%. It is also noted that selenium is not desirable and affects color in an undesirable way and provides no beneficial effects in achieving a desirable total solar radiation transmission.

One particular blue composition that provides superior spectral performance is disclosed in U.S. Pat. No. 4,792,536 to Pecoraro, et al. Commercial products which incorporate this patent are sold by PPG Industries, Inc. under the trademarks SOLEXTRA® and AZURLITE®. This glass has a dominant wavelength ranging from about 486 to 489 nm and excitation purity ranges from about 8 to 14 percent. It would be advantageous to be able to produce a dark and medium luminous transmission, under illuminant A, (LTA) tinted blue colored glass to complement this blue colored glass using conventional glass melting processing techniques. With the dark tinted blue glass as a privacy glazing and the medium LTA tinted blue glass as lighter than dark privacy glazing (generally an LTA or 40 to 60 percent), various luminous transmission glass compositions would be available for complementing the above referenced blue colored glass such as SOLEXTRA® glass. These glasses with complementing blue colors could be available for a wide range of use with, for example, motor vehicles as a transparent panel sets or vision, and vision and privacy transparent panels.

SUMMARY OF THE INVENTION

The present invention provides a blue colored, infrared and ultraviolet absorbing glass composition having a luminous transmittance of generally less than 70 percent. The glass uses a standard soda-lime-silica glass base composition and additionally primarily iron and cobalt, and optionally selenium and/or titanium, as infrared and ultraviolet radiation absorbing materials and colorants. The glass of the present invention has a color characterized by a dominant wavelength in the range of 479 to 495 nm., more particularly 480 to 491 nm., and most particularly up to 489 nm., and an excitation purity of at least 4, and more particularly at least 8 percent, at a thickness of 0.160 inches (4.06 millimeters). In one embodiment where the luminous transmittance is in the range of about 35 to about 60 percent the dominant wavelength can range from 479 to 495.

In one embodiment of the invention, the glass composition of a blue colored, infrared and ultraviolet radiation absorbing soda-lime-silica glass article includes a solar radiation absorbing and colorant portion consisting essentially of 0.9 to 2.0 percent by weight total iron, 0.15 to 0.65 percent by weight FeO, 90 to 250 PPM CoO, and optionally up to 12 PPM Se and up to 0.9 wt % $TiO_2$, and preferably 1 to 1.4 percent by weight total iron, 0.20 to 0.50 percent by weight FeO, 100 to 150 PPM CoO, up to 8 PPM Se, and up to 0.5 wt % $TiO_2$.

In another embodiment of the invention for a medium LTA in the range of about 35 to about 65 percent, more particularly from about 40 to about 60 percent, and most preferably about 45 to about 55 percent, the glass composition of a blue colored, infrared and ultraviolet radiation absorbing soda-lime-silica glass article includes a primary solar radiation absorbing and colorant portion. This portion has greater than 0.65 to 2.0 percent by weight total iron, 0.15 to 0.65 percent by weight FeO, 60 to 140 PPM CoO, particularly up to 130 PPM and selenium which is present greater than 0 up to an amount of about 15 PPM.

DETAILED DESCRIPTION OF THE INVENTION

Unless otherwise indicated, all numbers expressing quantities of ingredients, conditions and so forth used in the specification and claims are to be understood as being modified in all instances by the term "about". For example, for gross units by "about" it is meant plus or minus (+/−) 50%, preferably +/−40%, more preferably +/−25%, even more preferably +/−10%, still more preferably +/−5%, and most preferably is the reported value or a value in the stated range. Additionally, any numeric reference to amounts, unless otherwise specified, is "by weight percent". Also, unless indicated to the contrary, the numerical values set forth in the following specification and claims are approximations that may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.c., 5.5 to 10.

As used herein, the terms "solar control" and "solar control properties" mean properties which affect the solar properties, e.g., visible, IR or UV transmittance and/or reflectance of the glass.

The base glass of the present invention, that is, the major glass forming constituents of the glass that don't function as the primary infrared or ultraviolet absorbing materials and/or colorants, which are an object of the present invention, is commercial soda-lime-silica glass typically characterized as follows:

| | Weight Percent |
|---|---|
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As used herein, all "weight percent (wt %)" values are based on the total weight of the final glass composition.

To this base glass, the present invention adds at least a primary (predominant or major) infrared and ultraviolet radiation absorbing materials and colorants in the form of iron and cobalt and optionally selenium and/or titanium. As disclosed herein with respect to the glass compositions, iron is expressed in terms of $Fe_2O_3$ and FeO, cobalt is expressed in terms of CoO, selenium is expressed in terms of elemental Se and titanium is expressed in terms of $TiO_2$. It should be appreciated that the glass compositions disclosed herein may include small amounts of other materials, for example, melting and refining aids, tramp materials or impurities, or minor colorants or infrared and/or ultraviolet radiation absorbing materials. It should be further appreciated that in one embodiment of the invention, small amounts of additional materials may be included in the glass to provide the desired color characteristics and improve the solar performance of the glass, as will be discussed later in more detail.

The iron oxides in a glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant. The total amount of iron present in the glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$ and the term "FeO" shall mean iron in the ferrous state expressed in terms of FeO.

Cobalt oxide (CoO) operates as a blue colorant and does not exhibit any appreciable infrared or ultraviolet radiation absorbing properties. Se can act as an ultraviolet absorbing colorant. The neutral and reduced forms of selenium impart a pink or brown color to soda-lime-silica glass. Oxidized selenium does not impart a color to soda-lime-silica glass. Se may also absorb some infrared radiation and its use terds to reduce redox. $TiO_2$ is an ultraviolet radiation absorber that operates as a colorant imparting a yellow color to the glass composition. A proper balance between the iron, i.e. ferric and ferrous oxides and cobalt, and optionally selenium and/or titanium is required to obtain the desired blue colored privacy glass with the desired spectral properties.

For the medium LTA glass compositions having a luminous transmission (LTA) from 35 to 65 and more suitably from 40 to 60 and even more suitably from 45 to 55 for glass thickness of either 3.9 mm (0.154 inch) or 4.1 mm. (0.160 inch), the primary infrared and ultraviolet radiation absorbing materials and colorants can have specific ranges of amounts. The total iron generally ranges from greater than 0.65 to 2.0 and more suitably from greater than 0.9, such as 0.901, to 1.3, more particularly up to 1.1 weight percent. The cobalt oxide in the glass generally ranges from 30 to 250 PPM. When the redox value ranges from 0.14 to 0.4, the amount of cobalt oxide in the glass can be present in an amount from about 60 to about 250 PPM. When the redox value ranges from 0.4 to 0.58 more particularly 0.55, the amount of cobalt oxide in the glass can range from 30 to 130 PPM, more suitably up to 95 and most suitably up to 90 PPM.

The selenium generally ranges in any amount up to 15 PPM, more suitably up to 12 and most suitably up to 6 PPM.

The balance of these materials to achieve the blue color having a dominant wavelength in the range of 479 to 495 nm. and more suitably 480 to 491 nm. can involve having an amount of cobalt oxide at a higher amount in the stated range such as greater than 89 to 130 PPM when the amount of total iron is in the lower portion of the range for instance 0.65 to 0.9. Likewise when the amount of total iron is in the upper portion of the range such as from greater than 0.9, the amount of cobalt oxide can be present from 60 up to the 130 PPM or even more suitably from 60 to 95 PPM.

Other colorants which result in minor coloration effects that may optionally be present include: chromium, vanadium, manganese, neodymium, zinc, molybdenum, cerium, and mixtures thereof in minor amounts to the primary colorants. The amounts of these colorants for the minor coloration effect are such that the total amount of these materials would not alter the dominant wavelength to be outside the desired range of the dominant wavelength. Most preferably the glass composition is essentially free of colorants other than the primary colorants to avoid even the minor coloration effects. The glass composition of the present invention is most preferably essentially free of materials added to the batch to result in the glass composition having fluorine, nickel, and oxides of zirconium, cerium, boron, nickel, and barium in more than tramp or trace amounts.

The glass of the present invention may be melted and refined in a continuous, large-scale, commercial glass melting operation and formed into flat glass sheets of varying thickness by the float process in which the molten glass is supported on a pool of molten metal, usually tin, as it assumes a ribbon shape and is cooled, in a manner well known in the art.

Although it is preferred that the glass disclosed herein be made using a conventional, overhead fired continuous melting operation, as is well known in the art, the glass may also be produced using a multi-stage melting operation, as disclosed in U.S. Pat. No. 4,381,934 to Kunkle, et al., U.S. Pat. No. 4,792,536 to Pecoraro, et al. and 4,886,539 to Cerutti, et al. If required, a stirring arrangement may be employed within the melting and/or forming stages of the glass production operation to homogenize the glass in order to produce glass of the highest optical quality.

Depending on the type of melting operation, sulfur may be added to the batch materials of a soda-lime-silica glass as a melting and refining aid. Commercially produced float glass may include up to about 0.5 wt. % $SO_3$. In a glass composition that includes iron and sulfur, providing reducing conditions may create amber coloration which lowers luminous transmittance as discussed in U.S. Pat. No. 4,792,536 to Pecoraro, et al. Increasing the FeO content enables the absorption of glass in the infrared to be increased and the TSET to be reduced. However, when glass is manufactured in the presence of sulfur in highly reducing conditions, it may take on an amber color due to the formation of chromophores resulting from the reaction between sulfur and ferric iron. However, it is further believed that the reducing conditions required to produce this coloration in float glass compositions of the type disclosed herein for low redox systems are limited to approximately the first 20 microns of the lower glass surface contacting the molten tin during the float forming operation, and to a lesser extent, to the exposed upper glass surface. Because of the glass' low sulfur content (generally less than 0.3 weight percent) and the limited region of the glass in which any coloration could occur, depending on the particular soda-lime-silica glass composition, sulfur in these surfaces would not be a primary colorant. In other words, the absence of the iron sulfur chromophores would not result in the dominant wavelength for the colored glass going beyond the desired range of wavelength for the desired color for low redox conditions. Hence, these chromophores have little if any material effect on the glass color or spectral properties at low redox, i.e., below about 0.35. At high redox, i.e., above about 0.35, chromophores of iron polysulfides may form in the bulk glass itself. For example, for redox ratios greater than or equal to about 0.4, up to about 10 PPM of iron polysulfides might be present. This amount may provide a measurable change of dominant wavelength of less than one nm but not more than 2 or 3 nm. In any event such an effect can be compensated for with the components of the primary infrared and ultraviolet radiation absorbing and colorant portion to maintain the glass in the desired range of dominant wavelength.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration ranging from about 0.05 to 2 wt % in about the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however, the overall impact on the optical properties of the glass is minimal.

Table 1 illustrates examples of experimental glass melts having glass compositions which embody the principles of the present invention. Similarly, Table 2 illustrates a series of computer modeled glass compositions embodying the principles of the present invention. The modeled compositions were generated by a glass color and spectral performance computer model developed by PPG Industries, Inc. Tables 1 and 2 list only the iron, cobalt, selenium and titanium portions of the examples. Table 3 illustrates examples of experimental glass melts having glass compositions with medium dark LTA which embody the principles of the present invention. Analysis of selected experimental melts in Table 1 indicates that it is expected that the melts would most likely include up to about 10 PPM $Cr_2O_3$ and up to about 39 PPM $MnO_2$. Examples 5–19 also included up to about 0.032 weight percent $TiO_2$. It is presumed that the $Cr_2O_3$, $MnO_2$ and $TiO_2$ entered the glass melts as part of the cullet or as tramp material or impurities from other ingredients. In addition, the modeled compositions were modeled to include 7 PPM $Cr_2O_3$, to account for tramp material effects. It is believed that glass compositions of the instant invention produced by a commercial float process as discussed earlier may include low levels of $Cr_2O_3$, $MnO_2$ and less than 0.020 weight percent $TiO_2$, but these levels of such materials are considered to be tramps levels which would not materially affect the color characteristics and spectral properties of the blue glass of the present invention.

The spectral properties shown for Tables 1 and 2 are based on a reference thickness of 0.160 inches (4.06 mm). It should be appreciated that the spectral properties of the examples may be approximated at different thicknesses using the formulas disclosed in U.S. Pat. No. 4,792,536.

With respect to the transmittance data provided in Table 1, the luminous transmittance (LTA) is measured using C.I.E. standard illuminant "A" with a 2° observer over the wavelength range of 380 to 770 nanometers. Glass color, in terms of dominant wavelength and excitation purity, is measured using C.I.E. standard illuminant "C" with a 2° observer, following the procedures established in ASTM E308-90. The total solar ultraviolet transmittance (TSUV) is measured over the wavelength range of 300 to 400 nanometers, total solar infrared transmittance (TSIR) is measured over the wavelength range of 775 to 2125 nanometers, and total solar energy transmittance (TSET) is measured over the wavelength range of 275 to 2125 nanometers. The TSUV, TSIR and TSET transmittance data are calculated using Parry Moon air mass 2.0 direct solar irradiance data and integrated using the Trapezoidal Rule, as is known in the art. The spectral properties presented in Table 2 are based on the same wavelength ranges and calculation procedures.

SAMPLE PREPARATION

The information provided for Examples 1–4 in Table 1 is based on experimental laboratory melts having approximately the following batch components:

| | Ex. 1–3 | Ex. 4 |
|---|---|---|
| cullet A | 3000 gm | 2850 gm |
| cullet B | — | 150 gm |
| $TiO_2$ | 6 gm | 6 gm |

Cullet A included about 1.097 wt % total iron, 108 PPM CoO, 12 PPM Se and 7 PPM $Cr_2O_3$. Cullet B included about 0.385 wt % total iron, 67 PPM CoO, 12 PPM Se and 8 PPM $Cr_2O_3$. In preparing the melts, the ingredients were weighed out, mixed, placed in a platinum crucible and heated to 2650° F. (1454° C.) for 2 hours. Next, the molten glass was fritted in water, dried and reheated to 2650° F. (1454° C.) in a platinum crucible for 1 hour. The molten glass was then fritted a second time in water, dried and reheated to 2650° F. (1454° C.) in a platinum crucible for 2 hours. The molten glass was then poured out of the crucible to form a slab and annealed. Samples were cut from the slab and ground and polished for analysis.

The information provided for Examples 5–19 in Table 1 is based on experimental laboratory melts having approximately the following batch components:

| | |
|---|---|
| cullet | 239.74 gm |
| sand | 331.10 gm |
| soda ash | 108.27 gm |
| limestone | 28.14 gm |
| dolomite | 79.80 gm |
| salt cake | 2.32 gm |
| $Fe_2O_3$ (total iron) | as required |
| $Co_3O_4$ | as required |
| Se | as required |
| $TiO_2$ | as required |

The raw materials were adjusted to produce a final glass weight of 700 grams. Reducing agents were added as required to control redox. The cullet used in the melts (which formed approximately 30% of the melt) included up to 0.51 wt % total iron, 0.055 wt % $TiO_2$ and 7 PPM $Cr_2O_3$. In preparing the melts, the ingredients were weighed out and mixed. A portion of the raw batch material was then placed in a silica crucible and heated to 2450° F. (1343° C.). When the batch material melted down, the remaining raw materials were added to the crucible and the crucible was held at 2450° F. (1343° C.) for 30 minutes. The molten batch was then heated and held at temperatures of 2500° F. (1371° C.), 2550° F. (1399° C.), 2600° F. (1427° C.) for 30 minutes, 30 minutes and 1 hour, respectively. Next, the molten glass was fritted in water, dried and reheated to 2650° F. (1454° C.) in a platinum crucible for two hours. The molten glass was then poured out of the crucible to form a slab and annealed. Samples were cut from the slab and ground and polished for analysis.

The chemical analysis of the glass compositions (except for FeO) was determined using a RIGAKU 3370 X-ray fluorescence spectrophotometer. The spectral characteristics of the glass were determined on annealed samples using a Perkin-Elmer Lambda 9 UV/VIS/NIR spectrophotometer prior to tempering the glass or prolonged exposure to ultraviolet radiation, which will effect the spectral properties of the glass. The FeO content and redox were determined using the glass color and spectral performance computer model developed by PPG Industries, Inc.

The following is the approximate basic oxides of the experimental melts disclosed in Table 1:

| | Ex. 1–3 | Ex. 4 | Ex. 5–19 |
|---|---|---|---|
| $SiO_2$ (wt %) | 66.1 | 66.8 | 72.4 |
| $Na_2O$ (wt %) | 17.8 | 17.4 | 13.5 |
| CaO (wt %) | 7.8 | 7.9 | 8.7 |
| MgO (wt %) | 3.1 | 3.1 | 3.7 |
| $Al_2O_3$ (wt %) | 3.1 | 2.8 | 0.17 |
| $K_2O$ (wt %) | 0.70 | 0.63 | 0.049 |

It is expected that the basic oxide constituents of commercial soda-lime-silica glass compositions based on the experimental melts disclosed in Table 1 and the modeled compositions disclosed in Table 2 would fall within the ranges of the glass constituents as discussed earlier.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Total iron (wt %) | 1.110 | 1.116 | 1.117 | 1.044 | 1.233 | 1.230 | 1.237 | 1.238 | 1.236 | 1.232 |
| FeO (wt %) | 0.389 | 0.386 | 0.394 | 0.379 | 0.317 | 0.316 | 0.329 | 0.317 | 0.304 | 0.320 |
| Model redox | 0.350 | 0.346 | 0.353 | 0.362 | 0.257 | 0.257 | 0.266 | 0.256 | 0.246 | 0.260 |
| CoO (PPM) | 134 | 129 | 131 | 128 | 126 | 128 | 127 | 126 | 116 | 126 |
| Se (PPM) | 11 | 10 | 11 | 11 | 6 | 7 | 5 | 6 | 8 | 6 |
| $TiO_2$ (wt %) | 0.199 | 0.188 | 0.188 | 0.173 | 0.020 | 0.021 | 0.020 | 0.021 | 0.022 | 0.020 |
| LTA (%) | 28.1 | 28.8 | 29.5 | 29.6 | 35.1 | 35.2 | 35.4 | 35.4 | 35.7 | 35.8 |
| TSUV (%) | 16.6 | 17.0 | 18.1 | 19.1 | 21.7 | 21.4 | 22.0 | 21.6 | 20.4 | 22.12 |
| TSIR (%) | 9.2 | 9.2 | 8.9 | 9.7 | 12.7 | 13.9 | 11.9 | 12.7 | 13.7 | 12.4 |
| TSET (%) | 18.0 | 18.4 | 18.6 | 19.1 | 24.5 | 25.2 | 24.3 | 24.7 | 25.1 | 24.8 |
| DW (nm) | 488.6 | 488.5 | 487.7 | 488.0 | 484.9 | 485.1 | 484.7 | 485.0 | 487.0 | 484.7 |
| Pe (%) | 9.8 | 10.0 | 11.1 | 9.5 | 13.0 | 12.0 | 14.4 | 13.2 | 8.9 | 13.7 |

| | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| Total iron (wt %) | 1.234 | 1.225 | 1.226 | 1.204 | 1.212 | 1.217 | 1.208 | 1.213 | 1.204 |

TABLE 1-continued

| | | | | | | | | | |
|---|---|---|---|---|---|---|---|---|---|
| FeO (wt %) | 0.313 | 0.296 | 0.318 | 0.384 | 0.325 | 0.323 | 0.315 | 0.312 | 0.307 |
| Model redox | 0.254 | 0.242 | 0.259 | 0.319 | 0.268 | 0.265 | 0.261 | 0.257 | 0.255 |
| CoO (PPM) | 126 | 124 | 126 | 91 | 93 | 92 | 94 | 94 | 90 |
| Se (PPM) | 5 | 6 | 6 | 0 | 0 | 0 | 0 | 0 | 0 |
| $TiO_2$ (wt %) | 0.022 | 0.019 | 0.020 | 0.024 | 0.029 | 0.032 | 0.032 | 0.032 | 0.028 |
| LTA (%) | 36.2 | 36.3 | 36.4 | 44.7 | 45.4 | 45.4 | 45.5 | 45.6 | 46.7 |
| TSUV (%) | 22.3 | 21.7 | 22.5 | 29.3 | 27.7 | 27.4 | 27.3 | 27.2 | 27.8 |
| TSIR (%) | 12.9 | 14.3 | 12.7 | 8.5 | 11.9 | 12.3 | 12.8 | 13.0 | 13.3 |
| TSET (%) | 25.2 | 26.0 | 25.2 | 26.9 | 29.0 | 29.1 | 29.5 | 29.7 | 30.3 |
| DW (nm) | 484.7 | 485.0 | 484.6 | 484.8 | 484.9 | 484.9 | 484.9 | 484.9 | 485.2 |
| Pe (%) | 13.8 | 12.8 | 14.3 | 18.0 | 17.0 | 16.9 | 16.5 | 16.7 | 16.1 |

TABLE 2

| | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex.32 |
|---|---|---|---|---|---|---|---|---|---|---|---|---|---|
| Total iron (wt %) | 1.8 | 1.8 | 1.6 | 1.45 | 1.3 | 0.975 | 1.1 | 1.1 | 1.1 | 1.0 | 1.45 | 1.1 | 1.2 |
| FeO (wt %) | 0.63 | 0.63 | 0.56 | 0.51 | 0.46 | 0.23 | 0.17 | 0.17 | 0.33 | 0.22 | 0.32 | 0.31 | 0.31 |
| Model redox | 0.35 | 0.35 | 0.35 | 0.35 | 0.35 | 0.24 | 0.15 | 0.15 | 0.3 | 0.22 | 0.22 | 0.28 | 0.26 |
| CoO (PPM) | 200 | 200 | 175 | 150 | 140 | 190 | 200 | 200 | 110 | 175 | 140 | 110 | 150 |
| Se (PPM) | 0 | 0 | 0 | 0 | 0 | 0 | 0 | 0 | 10 | 1 | 3 | 10 | 1 |
| $TiO_2$ (wt %) | 0.6 | 0 | 0.6 | 0.6 | 0.4 | 0.1 | 0.05 | 0 | 0.02 | 0.4 | 0.02 | 0.02 | 0.6 |
| LTA (%) | 23.9 | 24.8 | 27.8 | 31.8 | 34.9 | 35.0 | 35.0 | 35.1 | 35.5 | 35.9 | 35.9 | 36.0 | 36.0 |
| TSUV (%) | 17.4 | 21.5 | 19.7 | 21.7 | 25.5 | 30.8 | 25.4 | 25.9 | 24.2 | 25.8 | 20.0 | 23.6 | 21.8 |
| TSIR (%) | 2.7 | 2.7 | 2.8 | 4.9 | 6.5 | 21.8 | 32.7 | 32.7 | 12.7 | 23.7 | 13.5 | 14.4 | 14.1 |
| TSET (%) | 14.1 | 15.2 | 16.3 | 18.6 | 21.1 | 30.7 | 36.0 | 36.1 | 23.6 | 31.1 | 24.6 | 24.6 | 25.2 |
| DW (nm) | 482.1 | 481.1 | 482.7 | 483.4 | 483.0 | 480.1 | 480.6 | 480.5 | 485.2 | 481.5 | 485.0 | 485.7 | 484.0 |
| Pe (%) | 34.5 | 38.4 | 30.5 | 26.6 | 25.9 | 27.9 | 24.8 | 25.2 | 9.9 | 21.7 | 17.3 | 8.7 | 19.0 |

| | Ex. 33 | Ex. 34 | Ex. 35 | Ex. 36 | Ex. 37 | Ex. 38 | Ex. 39 | Ex. 40 | Ex. 41 | Ex. 42 | Ex. 43 | 44 |
|---|---|---|---|---|---|---|---|---|---|---|---|---|
| Total iron (wt %) | 1.1 | 1.6 | 1.3 | 1.8 | 1.1 | 1.1 | 1.1 | 1.1 | 1.0 | 1.0 | 1.0 | 1.0 |
| FeO (wt %) | 0.39 | 0.35 | 0.29 | 0.40 | 0.24 | 0.28 | 0.31 | 0.28 | 0.22 | 0.22 | 0.22 | 0.25 |
| Model redox | 0.35 | 0.22 | 0.22 | 0.22 | 0.22 | 0.25 | 0.28 | 0.25 | 0.22 | 0.22 | 0.22 | 0.25 |
| CoO (PPM) | 95 | 140 | 140 | 110 | 140 | 140 | 130 | 110 | 120 | 110 | 95 | 90 |
| Se (PPM) | 10 | 1 | 3 | 1 | 3 | 0 | 0 | 0 | 0 | 0 | 0 | 0 |
| $TiO_2$ (wt %) | 0.02 | 0.02 | 0.02 | 0.02 | 0.02 | 0 | 0.1 | 0 | 0.05 | 0.02 | 0.02 | 0 |
| LTA (%) | 36.1 | 36.1 | 37.1 | 38.5 | 38.9 | 40.6 | 41.0 | 45.3 | 45.6 | 47.4 | 50.1 | 50.1 |
| TSUV (%) | 25.9 | 18.8 | 22.4 | 16.3 | 26.1 | 29.6 | 29.6 | 30.0 | 30.3 | 30.7 | 30.7 | 32.1 |
| TSIR (%) | 9.4 | 11.3 | 16.3 | 8.9 | 20.9 | 17.4 | 14.4 | 17.4 | 23.8 | 23.9 | 23.9 | 20.1 |
| TSET (%) | 22.0 | 23.5 | 26.9 | 22.5 | 30.5 | 30.0 | 28.4 | 31.5 | 35.3 | 36.0 | 36.9 | 34.9 |
| DW (nm) | 485.5 | 485.3 | 484.1 | 488.6 | 482.9 | 482.4 | 482.8 | 484.0 | 483.4 | 483.9 | 485.0 | 484.9 |
| Pe (%) | 10.6 | 19.4 | 17.3 | 15.4 | 17.4 | 22.4 | 21.9 | 18.2 | 17.6 | 16.4 | 14.3 | 15.3 |

Referring to Tables 1 and 2, the present invention provides a blue colored glass having a standard soda-lime-silica glass base composition and additionally iron and cobalt, and optionally selenium and titanium, as infrared and ultraviolet radiation absorbing materials and colorants, a luminous transmittance (LTA) of greater than 20% up to 60%, and a color characterized by a dominant wavelength (DW) in the range of 480 to 489 nanometers (nm), preferably 482 to 487 nm, and an excitation purity (Pe) of at least 8%, preferably 10 to 30% at a thickness of 0.16 inches (4.06 mm). It is anticipated that the color of the glass may vary within the dominant wavelength range to provide a desired product.

The redox ratio for the glass is maintained between 0.15 to 0.40, preferably between 0.20 to 0.35, more preferably between 0.24 to 0.32. The glass composition also has a TSUV of no greater than 35%, preferably no greater than 30%; a TSIR of no greater than 25%, preferably no greater than 20%; and a TSET of no greater than 40%, preferably no greater than 35%.

In one particular embodiment, the glass composition includes 0.9 to 2 wt % total iron, preferably 1 to 1.4 wt % total iron, and more preferably 1.1 to 1.3 wt % total iron; 0.15 to 0.65 wt % FeO, preferably 0.2 to 0.5 wt % FeO, and more preferably 0.24 to 0.40 wt % FeO; and 90 to 250 PPM CoO, preferably 100 to 150 PPM CoO, and more preferably 110 to 140 PPM CoO. As discussed earlier, selenium may also be included in the glass composition and more specifically, 0 to 12 PPM Se, preferably 0 to 8 PPM Se. One embodiment of the invention includes 1 to 6 PPM Se. Similarly, titanium may also be included in the glass composition, and more specifically, 0 to 0.9 wt % $TiO_2$, preferably, 0 to 0.5 wt % $TiO_2$. One embodiment of the invention includes 0.02 to 0.3 wt % $TiO_2$.

In one particular embodiment of the invention, the glass composition is selenium-free and has an LTA of greater than 20% up to 60%, and preferably greater than 35% up to 55%. In another embodiment of the invention, the glass composition is selenium-free and has less than 200 PPM CoO. In still another embodiment of the invention, the glass composition has up to 12 PPM Se and has an LTA of greater than 35% up to 60%, preferably 40 to 55%. As in Table 1, the samples for Table 3 were prepared in the same manner utilizing batch material as for Examples 9–15 of Table 1 to achieve the compositions of the glasses depicted in Table 3. Also as with Table 1 the analysis of the glass compositions for Table 3 indicate the presence of small amounts of $Cr_2O_3$, $MnO_2$, and $TiO_2$. Generally around less than 10 PPM $Cr_2O_3$ can be present although a few of the examples had the amount of $Cr_2O_3$ of 150 to 154 PPM. Generally the amount of $TiO_2$ can be about 0.021 to 0.026 weight percent. The amount of $MnO_2$ can be around 18 to 28 PPM. Except for those examples with the higher amounts of $Cr_2O_3$ as with Table 1, it is presumed that the $Cr_2O_3$, $MnO_2$, and $TiO_2$ entered the glass melts as part of the cullet or as tramp material or impurities from other ingredients. It is believed that glass compositions of the instant invention produced by a commercial float process as discussed earlier may include Low levels of $Cr_2O_3$ and $MnO_2$ and less than 0.020 weight percent $TiO_2$, but these levels of such materials are considered to be tramps levels which would not materially affect the color.

The spectral properties shown for Table 3 are based on a reference thickness of 0.154 inches (3.9 mm). The numerical values of Table 3 for L*, a* and b*, are calculated from the tristimulus values (X, Y, Z) and identify the characteristics of lightness and hue, respectively, in the system commonly referred to as the CIELAB color system. The lightness, or value, distinguishes the degree of lightness or darkness ard L* indicates the lightness or darkness of the color and represents the lightness plane on which the color resides. Hue distinguishes colors such as red, yellow, green and blue.

The symbol "a*" indicates the position of the color on a red (+a*) green (−a*) axis. The symbol "b*" indicates the color position on a yellow (+b*) blue (−b*) axis. It should be appreciated that color may be characterized in any of these color systems and one skilled in the art may calculate equivalent DW and Pe values; L*, a*, b* values from the transmittance curves of the viewed glass or composite transparency. A detailed discussion of color calculations is given in U.S. Pat. No. 5,792,559, herein incorporated by reference. The L*, a*, and b* values were determined using the reference illuminant (D65) and a Lambda 9 spectrophotometer, commercially available from Perkin-Elmer Corporation. The transmitted color spectrum of the glass can be converted to a color, i.e. chromaticity coordinates, using the method disclosed in ASTM E 308-85 for a D65 illuminant and a standard observer of CIE 1964 (10°) observer.

TABLE 3

| | Ex. 45 | Ex. 46 | Ex. 47 | Ex. 48 | Ex. 49 | Ex. 50 | Ex. 51 | Ex. 52 | Ex. 53 | Ex. 54 | Ex. 55 | Ex. 56 | Ex. 57 | Ex. 58 |
|---|---|---|---|---|---|---|---|---|---|---|---|---|---|---|
| Total iron (wt %) | 0.666 | 0.654 | 0.664 | 0.662 | 0.788 | 0.774 | 0.793 | 0.782 | 0.7796 | 0.7794 | 0.794 | 0.799 | 0.794 | 0.791 |
| Model redox | 0.141 | 0.286 | 0.298 | 0.294 | 0.244 | 0.268 | 0.262 | 0.270 | 0.257 | 0.259 | 0.273 | 0.266 | 0.266 | 0.274 |
| CoO (PPM) | 91 | 91 | 93 | 90 | 86 | 80 | 86 | 84 | 79 | 79 | 82 | 81 | 80 | 80 |
| Se (PPM) | 22 | 8 | 8 | 8 | 13 | 10 | 11 | 11 | 9 | 8 | 7 | 8 | 7 | 6 |
| SO3 (wt %) | 0.256 | 0.198 | 0.196 | 0.199 | 0.218 | 0.205 | 0.217 | 0.217 | 0.215 | 0.214 | 0.21 | 0.214 | 0.205 | 0.203 |
| Coal #/1000# sand | 1.30 | 1.35 | 1.40 | 1.45 | 1.20 | 1.20 | 1.25 | 1.25 | 1.20 | 1.20 | 1.25 | 1.25 | 1.25 | 1.25 |
| LTA (%) | 49.25 | 48.14 | 47.77 | 47.95 | 45.00 | 46.78 | 44.70 | 44.54 | 48.88 | 48.17 | 49.10 | 47.98 | 49.62 | 50.18 |
| TSUV (%) | 30.13 | 38.10 | 38.18 | 38.25 | 29.63 | 32.13 | 30.36 | 30.27 | 33.44 | 33.07 | 34.81 | 33.21 | 35.13 | 35.98 |
| TSIR (%) | 50.74 | 28.86 | 27.00 | 27.57 | 27.95 | 25.58 | 25.54 | 25.01 | 25.94 | 25.82 | 24.16 | 24.83 | 25.00 | 24.17 |
| TSET (%) | 50.76 | 39.43 | 38.28 | 38.65 | 36.72 | 36.39 | 35.38 | 34.99 | 37.77 | 37.25 | 37.12 | 36.68 | 37.71 | 37.59 |
| DW (nm) | 479.58 | 482.92 | 483.02 | 483.03 | 491.01 | 487.37 | 488.11 | 488.44 | 486.58 | 486.59 | 485.37 | 486.42 | 485.15 | 484.87 |
| Pe (%) | 1.41 | 7.47 | 8.13 | 7.66 | 1.97 | 4.09 | 3.25 | 3.21 | 4.92 | 5.18 | 6.44 | 5.56 | 7.64 | 8.57 |
| L* | 75.63 | 75.73 | 75.59 | 75.64 | 73.10 | 74.54 | 73.06 | 72.95 | 75.98 | 75.58 | 76.30 | 75.50 | 76.80 | 77.28 |
| a* | 0.20 | −2.98 | −3.37 | −3.13 | −1.55 | −2.72 | −2.14 | −2.18 | −3.22 | −3.39 | −3.79 | −3.60 | −4.54 | −5.03 |
| b* | −1.47 | −5.74 | −6.17 | −5.84 | −0.95 | −2.43 | −1.88 | −1.81 | −3.04 | −3.18 | −4.27 | −3.43 | −5.09 | −5.80 |

| | Ex. 59 | Ex. 60 | Ex. 61 | Ex. 62 | Ex. 63 | Ex. 64 | Ex. 65 | Ex. 66 | Ex. 67 | Ex. 68 | Ex. 69 | Ex. 70 | Ex. 71 | Ex. 72 |
|---|---|---|---|---|---|---|---|---|---|---|---|---|---|---|
| Total iron (wt %) | 0.792 | 0.793 | 0.797 | 0.791 | 0.794 | 0.790 | 0.791 | 0.792 | 0.794 | 0.796 | 1.052 | 1.059 | 1.060 | 1.034 |
| Model redox | 0.276 | 0.265 | 0.268 | 0.263 | 0.283 | 0.263 | 0.249 | 0.247 | 0.245 | 0.257 | 0.204 | 0.208 | 0.223 | 0.215 |
| CoO (PPM) | 80 | 80 | 72 | 73 | 71 | 72 | 80 | 80 | 82 | 83 | 74 | 75 | 74 | 75 |
| Se (PPM) | 6 | 7 | 8 | 9 | 6 | 8 | 5 | 6 | 7 | 5 | 7 | 8 | 7 | 8 |
| $Cr_2O_3$ (PPM) | | | | | | | 154 | 154 | 150 | 153 | — | — | — | — |
| SO3 (wt %) | 0.206 | 0.217 | 0.207 | 0.209 | 0.201 | 0.21 | 0.21 | 0.215 | 0.22 | 0.209 | 0.248 | 0.251 | 0.245 | 0.25 |
| Coal #/1000# sand | 1.25 | 1.25 | 1.25 | 1.25 | 1.25 | 1.25 | 1.25 | 1.25 | 1.25 | 1.25 | 0.90 | 0.95 | 1.00 | 1.05 |
| LTA (%) | 49.49 | 49.22 | 49.33 | 48.98 | 50.23 | 48.67 | 49.62 | 49.30 | 49.29 | 48.64 | 48.32 | 47.47 | 47.29 | 47.71 |
| TSUV (%) | 35.07 | 34.43 | 33.13 | 32.97 | 34.76 | 32.04 | 35.07 | 34.93 | 34.85 | 34.90 | 25.61 | 24.86 | 25.50 | 26.04 |
| TSIR (%) | 23.87 | 25.14 | 24.65 | 25.47 | 23.04 | 25.47 | 27.14 | 27.39 | 27.63 | 25.93 | 24.41 | 23.65 | 21.59 | 23.35 |
| TSET (%) | 37.03 | 37.50 | 36.99 | 37.26 | 36.67 | 37.06 | 38.42 | 38.41 | 38.51 | 37.36 | 36.05 | 35.19 | 34.06 | 35.19 |
| DW (nm) | 485.17 | 485.64 | 487.87 | 488.40 | 486.63 | 489.95 | 489.38 | 489.56 | 489.70 | 489.23 | 492.27 | 493.28 | 491.57 | 492.34 |
| Pe (%) | 8.11 | 6.74 | 4.80 | 4.05 | 6.37 | 3.20 | 6.76 | 6.47 | 6.15 | 6.85 | 3.96 | 3.64 | 4.52 | 3.84 |
| L* | 76.79 | 76.44 | 76.29 | 75.97 | 77.06 | 75.67 | 76.83 | 76.59 | 76.53 | 76.22 | 75.66 | 75.08 | 75.08 | 75.25 |
| a* | −4.87 | −4.16 | −3.68 | −3.16 | −4.48 | −2.82 | −6.40 | −6.17 | −5.91 | −6.32 | −4.75 | −4.67 | −5.09 | −4.55 |
| b* | −5.37 | −4.37 | −2.65 | −2.17 | −3.84 | −1.48 | −3.08 | −2.90 | −2.72 | −3.18 | −1.03 | −0.71 | −1.38 | −1.01 |

| | Ex. 73 | Ex. 74 | Ex. 75 | Ex. 76 | Ex. 77 | Ex. 78 | Ex. 79 | Ex. 80 | Ex. 81 | Ex. 82 | Ex. 83 | Ex. 84 | Ex. 85 | Ex. 86 |
|---|---|---|---|---|---|---|---|---|---|---|---|---|---|---|
| Total iron (wt %) | 1.062 | 1.048 | 1.061 | 1.061 | 1.004 | 1.003 | 1.012 | 1.009 | 1.002 | 1.006 | 1.009 | 1.005 | 1.077 | 1.080 |
| Model redox | 0.214 | 0.222 | 0.235 | 0.236 | 0.211 | 0.212 | 0.220 | 0.223 | 0.230 | 0.244 | 0.243 | 0.260 | 0.193 | 0.201 |
| CoO (PPM) | 74 | 74 | 74 | 74 | 75 | 76 | 79 | 76 | 77 | 78 | 76 | 78 | 71 | 73 |
| Se (PPM) | 7 | 7 | 7 | 7 | 5 | 6 | 8 | 6 | 5 | 4 | 5 | 4 | 7 | 7 |
| $Cr_2O_3$ (PPM) | — | — | | | | | | | | | | | | |
| SO3 (wt %) | 0.234 | 0.236 | 0.246 | 0.241 | 0.229 | 0.22 | 0.229 | 0.22 | 0.227 | 0.223 | 0.226 | 0.228 | 0.224 | 0.224 |

TABLE 3-continued

| | | | | | | | | | | | | | | |
|---|---|---|---|---|---|---|---|---|---|---|---|---|---|---|
| Coal #/1000# sand | 0.90 | 0.95 | 1.00 | 1.05 | 0.90 | 0.95 | 1.00 | 1.05 | 1.15 | 1.20 | 1.25 | 1.30 | 0.90 | 0.95 |
| LTA (%) | 48.32 | 47.16 | 46.52 | 46.77 | 49.84 | 49.47 | 46.65 | 48.86 | 49.49 | 49.49 | 48.52 | 49.05 | 49.11 | 48.27 |
| TSUV (%) | 26.45 | 25.81 | 26.07 | 26.15 | 28.44 | 28.16 | 26.00 | 27.89 | 29.25 | 29.97 | 28.61 | 30.45 | 24.63 | 24.42 |
| TSIR (%) | 22.78 | 22.06 | 19.99 | 19.84 | 24.86 | 24.73 | 23.41 | 23.04 | 22.28 | 20.41 | 20.50 | 18.63 | 25.41 | 24.13 |
| TSET (%) | 35.19 | 34.24 | 32.87 | 32.91 | 37.21 | 36.95 | 34.82 | 35.81 | 35.82 | 34.89 | 34.34 | 33.74 | 36.80 | 35.72 |
| DW (nm) | 491.95 | 492.48 | 491.13 | 490.76 | 488.97 | 489.13 | 491.26 | 488.59 | 487.34 | 486.76 | 487.67 | 486.53 | 495.08 | 495.01 |
| Pe (%) | 4.16 | 3.92 | 4.75 | 5.07 | 5.61 | 5.48 | 4.12 | 6.25 | 7.48 | 8.71 | 7.44 | 9.31 | 3.18 | 3.23 |
| L* | 75.68 | 74.91 | 74.61 | 74.82 | 76.80 | 76.55 | 74.58 | 76.28 | 76.82 | 76.98 | 76.21 | 76.78 | 76.08 | 75.55 |
| a* | −4.85 | −4.67 | −5.09 | −5.32 | −5.18 | −5.11 | −4.40 | −5.58 | −5.98 | −6.63 | −6.08 | −6.90 | −4.70 | −4.71 |
| b* | −1.18 | −1.00 | −1.59 | −1.79 | −2.59 | −2.48 | −1.39 | −2.98 | −4.07 | −4.97 | −3.90 | −5.40 | −0.22 | −0.25 |

| | Ex. 87 | Ex. 88 | Ex. 89 | Ex. 90 | Ex. 91 | Ex. 92 | Ex. 93 | Ex. 94 | Ex. 95 | Ex. 96 | Ex. 97 | Ex. 98 | Ex. 99 | Ex. 100 |
|---|---|---|---|---|---|---|---|---|---|---|---|---|---|---|
| Total iron (wt %) | 1.066 | 1.078 | 1.868 | 1.861 | 0.862 | 0.860 | 0.692 | 0.701 | 0.702 | 0.701 | 1.215 | 1.211 | 1.221 | 1.208 |
| Model redox | 0.206 | 0.215 | 0.178 | 0.225 | 0.232 | 0.245 | 0.238 | 0.243 | 0.245 | 0.249 | 0.231 | 0.234 | 0.244 | 0.237 |
| CoO (PPM) | 72 | 72 | 87 | 86 | 87 | 86 | 92 | 94 | 95 | 94 | 71 | 71 | 72 | 70 |
| Se (PPM) | 7 | 7 | 10 | 8 | 9 | 7 | 5 | 6 | 6 | 6 | 5 | 4 | 5 | 5 |
| SO3 (wt %) | 0.227 | 0.229 | 0.25 | 0.248 | 0.252 | 0.245 | 0.254 | 0.238 | 0.24 | 0.233 | 0.213 | 0.222 | 0.228 | 0.224 |
| Coal #/1000# sand | 1.00 | 1.05 | 0.90 | 0.95 | 1.00 | 1.05 | 0.90 | 0.95 | 1.00 | 1.05 | 1.25 | 1.28 | 1.30 | 1.33 |
| LTA (%) | 47.79 | 47.36 | 48.54 | 47.55 | 47.12 | 47.68 | 50.49 | 49.54 | 49.97 | 49.72 | 47.24 | 46.96 | 45.83 | 46.26 |
| TSUV (%) | 24.53 | 24.59 | 28.36 | 29.98 | 30.13 | 31.20 | 37.83 | 37.88 | 38.14 | 38.23 | 23.55 | 23.70 | 23.00 | 23.01 |
| TSIR (%) | 23.77 | 22.08 | 34.97 | 27.63 | 26.72 | 25.01 | 32.90 | 31.85 | 31.60 | 31.09 | 16.70 | 16.38 | 15.09 | 16.10 |
| TSET (%) | 35.32 | 34.22 | 42.15 | 37.91 | 37.26 | 36.67 | 42.74 | 41.82 | 41.90 | 41.51 | 31.26 | 30.96 | 26.69 | 30.40 |
| DW (nm) | 495.23 | 494.30 | 488.21 | 486.73 | 486.49 | 486.06 | 482.92 | 482.70 | 482.80 | 482.77 | 490.60 | 490.52 | 490.87 | 491.65 |
| Pe (%) | 3.11 | 3.50 | 3.53 | 5.47 | 5.77 | 6.67 | 8.50 | 8.64 | 9.05 | 9.01 | 6.90 | 6.86 | 6.80 | 6.05 |
| L* | 75.23 | 75.01 | 75.61 | 75.23 | 74.99 | 75.47 | 77.35 | 76.77 | 77.10 | 76.93 | 75.45 | 75.26 | 74.52 | 74.70 |
| a* | −4.54 | −4.81 | −2.72 | −3.72 | −3.82 | −4.32 | −3.70 | −3.58 | −3.89 | −3.83 | −7.54 | −7.40 | −7.48 | −7.07 |
| b* | −0.21 | −0.45 | −1.91 | −3.25 | −3.48 | −4.13 | −6.51 | −6.67 | −6.94 | −6.92 | −2.33 | −2.36 | −2.19 | −1.67 |

| | Ex. 101 | Ex. 102 | Ex. 103 | Ex. 104 | Ex. 105 | Ex. 106 | Ex. 107 | Ex. 108 | Ex. 109 | Ex. 110 | Ex. 111 | Ex. 112 | Ex. 113 | Ex. 114 |
|---|---|---|---|---|---|---|---|---|---|---|---|---|---|---|
| Total iron (wt %) | 1.073 | 1.065 | 1.064 | 1.071 | 0.777 | 0.780 | 0.783 | 0.776 | 1.157 | 1.148 | 1.160 | 1.156 | 0.912 | 0.900 |
| Model redox | 0.227 | 0.238 | 0.243 | 0.247 | 0.244 | 0.252 | 0.266 | 0.263 | 0.229 | 0.242 | 0.245 | 0.254 | 0.260 | 0.249 |
| CoO (PPM) | 73 | 72 | 72 | 72 | 92 | 92 | 94 | 92 | 68 | 68 | 68 | 69 | 85 | 84 |
| Se (PPM) | 5 | 5 | 5 | 5 | 4 | 4 | 4 | 4 | 8 | 7 | 8 | 8 | 3 | 3 |
| SO3 (wt %) | 0.229 | 0.221 | 0.225 | 0.22 | 0.213 | 0.217 | 0.212 | 0.214 | 0.216 | 0.22 | 0.216 | 0.218 | 0.207 | 0.197 |
| Coal #/1000# sand | 1.20 | 1.23 | 1.25 | 1.28 | 1.15 | 1.20 | 1.25 | 1.30 | 1.28 | 1.30 | 1.32 | 1.34 | 1.28 | 1.30 |
| LTA (%) | 48.44 | 48.82 | 48.22 | 48.02 | 51.34 | 50.87 | 50.19 | 50.67 | 51.07 | 50.66 | 49.99 | 49.04 | 49.45 | 50.73 |
| TSUV (%) | 26.23 | 27.10 | 26.36 | 26.61 | 37.56 | 38.23 | 38.28 | 38.31 | 26.51 | 26.95 | 26.34 | 26.40 | 33.54 | 33.99 |
| TSIR (%) | 20.65 | 19.53 | 18.91 | 18.29 | 28.37 | 27.29 | 25.40 | 26.12 | 18.23 | 16.95 | 16.31 | 15.48 | 21.44 | 23.17 |
| TSET (%) | 34.24 | 33.85 | 33.08 | 32.65 | 40.86 | 40.11 | 38.82 | 39.36 | 34.03 | 33.23 | 32.51 | 31.63 | 35.89 | 37.41 |
| DW (nm) | 490.67 | 489.60 | 489.74 | 489.37 | 483.38 | 483.20 | 483.16 | 483.29 | 488.90 | 488.20 | 488.57 | 488.56 | 484.72 | 484.78 |
| Pe (%) | 5.04 | 5.96 | 6.31 | 6.76 | 11.04 | 11.09 | 11.72 | 11.16 | 8.32 | 9.30 | 8.99 | 8.88 | 10.78 | 10.58 |
| L* | 75.88 | 76.24 | 75.93 | 75.86 | 78.27 | 77.97 | 77.64 | 77.86 | 78.03 | 77.91 | 77.46 | 76.84 | 77.15 | 77.92 |
| a* | −5.37 | −5.86 | −6.29 | −6.53 | −5.59 | −5.40 | −5.68 | −5.50 | −8.16 | −8.56 | −8.51 | −8.30 | −6.50 | −6.50 |
| b* | −1.80 | −2.49 | −2.56 | −2.87 | −8.15 | −8.26 | −8.72 | −8.27 | −3.69 | −4.48 | −4.13 | −4.09 | −7.22 | −7.10 |

| | Ex. 115 | Ex. 116 | Ex. 117 | Ex. 118 | Ex. 119 | Ex. 120 | Ex. 121 | Ex. 122 | Ex. 123 | Ex. 124 | Ex. 125 | Ex. 126 | Ex. 127 |
|---|---|---|---|---|---|---|---|---|---|---|---|---|---|
| Total iron (wt %) | 0.903 | 0.896 | 1.171 | 1.158 | 1.169 | 1.169 | 1.060 | 1.061 | 1.066 | 1.066 | 1.053 | 1.060 | 1.058 |
| Model redox | 0.253 | 0.255 | 0.256 | 0.262 | 0.242 | 0.259 | 0.243 | 0.234 | 0.252 | 0.256 | 0.254 | 0.266 | 0.259 |
| CoO (PPM) | 84 | 85 | 72 | 71 | 70 | 71 | 77 | 77 | 79 | 78 | 77 | 78 | 77 |
| Se (PPM) | 3 | 4 | 5 | 5 | 5 | 5 | 3 | 3 | 3 | 3 | 3 | 3 | 3 |
| SO3 (wt %) | 0.207 | 0.215 | 0.215 | 0.206 | 0.212 | 0.212 | 0.21 | 0.214 | 0.22 | 0.211 | 0.208 | 0.206 | 0.208 |
| Coal #/1000# sand | 1.32 | 1.34 | 1.32 | 1.33 | 1.34 | 1.35 | 1.32 | 1.33 | 1.34 | 1.35 | 1.36 | 1.36 | 1.37 |
| LTA (%) | 51.41 | 50.37 | 45.04 | 45.47 | 46.71 | 44.94 | 49.51 | 49.90 | 48.68 | 48.94 | 49.52 | 48.90 | 48.72 |
| TSUV (%) | 35.67 | 33.95 | 23.14 | 23.22 | 23.84 | 22.68 | 28.62 | 28.41 | 28.57 | 29.04 | 29.50 | 29.40 | 29.16 |
| TSIR (%) | 22.64 | 22.56 | 14.99 | 14.69 | 16.51 | 14.67 | 19.07 | 20.11 | 17.93 | 18.54 | 18.00 | 16.58 | 17.33 |
| TSET (%) | 37.64 | 36.91 | 29.28 | 29.30 | 30.93 | 29.02 | 34.13 | 34.85 | 33.13 | 32.99 | 33.63 | 32.60 | 32.88 |
| DW (nm) | 484.36 | 484.78 | 490.91 | 490.62 | 490.44 | 490.98 | 486.94 | 487.16 | 486.83 | 486.74 | 486.72 | 486.50 | 486.84 |
| Pe (%) | 11.45 | 10.62 | 6.58 | 7.06 | 6.86 | 6.76 | 9.58 | 9.08 | 9.72 | 10.02 | 9.93 | 10.69 | 9.79 |
| L* | 78.45 | 77.70 | 73.95 | 74.31 | 75.09 | 73.92 | 77.15 | 77.33 | 76.84 | 77.07 | 77.19 | 76.91 | 76.67 |
| a* | −6.77 | −6.49 | −7.14 | −7.57 | −7.33 | −7.42 | −7.58 | −7.37 | −7.54 | −7.73 | −7.68 | −8.09 | −7.59 |
| b* | −7.92 | −7.12 | −2.12 | −2.38 | −2.40 | −2.13 | −5.31 | −4.94 | −5.43 | −5.65 | −5.62 | −6.14 | −5.47 |

It is expected that the spectral properties of the glass will change after tempering the glass and further upon prolonged exposure to ultraviolet radiation, commonly referred to as "solarization". In particular, it is estimated that tempering and solarization of the glass compositions disclosed herein may reduce the LTA and TSIR by about 0.5 to 1%, reduce the TSUV by about 1 to 2%, and the TSET by about 1 to 1.5%. As a result, in one embodiment of the invention, the glass has selected spectral properties that initially fall outside the desired ranges previously discussed but fall within the desired ranges after tempering and/or solarization.

Glass as disclosed herein and made by the float process typically ranges from a sheet thickness of about 1 millimeter to 10 millimeters.

For vehicle glazing applications, it is preferred that the glass sheets having a composition and spectral properties as disclosed herein have a thickness generally in the range of 1.5 to 10 millimeters and more particularly within the range of 0.121 to 0.197 inches (3.1 to 5 mm). It is anticipated that when using a single glass ply in the above thickness range, the glass will be tempered or laminated, e.g. for an automotive side or rear window.

It is also contemplated that the glass will have architectural applications and be used at thicknesses ranging from about 0.14 to 0.24 inches (3.6 to 6 mm).

When multiple plies are used for either automotive or architectural applications, it is anticipated that the glass plies will be annealed and laminated together using a thermoplastic interlayer adhesive, such as polyvinyl butyral.

The glass of the present invention as dark blue glass or medium LTA blue glass can be provided together or individually with windshields as sets of transparent panels for motor vehicles such as cars. In different parts of the world, governmental agencies with responsibility for regulating or licensing motor vehicle safety or use of highways or other public thoroughfares have prescribed minimum luminous light transmittance values for particular automotive "vision panels", such as windshields and front sidelights. For instance, United States Federal regulations require the luminous light transmittance (LTA) of automotive windshields and front sidelights to be at least 65% and preferably 70%. The luminous transmittance requirements for other automotive transparencies, such as back sidelights and rear lights of trucks and minivans, and for non-vision panels, such as sun roofs, moon roofs and the like, are typically less than those for windshields and front sidelights. Other areas of the world may have a different prescribed minimum. The glass of the present invention can be the vision panels for sidelights at the medium dark LTA or as more typical type of privacy glass for back sidelights behind the "B" pillar or as the backlight in vans and trucks.

Such sets can be fabricated from the glass of the present invention by any method known to those skilled in the art. For instance sidelights, backlights, windshields and sunroofs can be made in accordance with the descriptions of U.S. Pat. Nos. 5,858,047 or 5,833,729 or 6,076,373 all of which are incorporated herein by reference.

Generally such sets of transparent glass glazing panels for mounting on an automobile vehicle can include: a windshield, front side windows, rear side windows;and a rear window. For panels in such a set at least one of the front side windows, rear side windows; or rear window has the glazing panel of medium LTA glass composition of the present invention. In a particular embodiment the transparent glass glazing panel set for mounting on an automobile vehicle, at least one and preferably both of the front side windows and/or rear side windows and/or rear window has the glass glazing panel with a glass composition that is blue-colored and infrared and ultraviolet radiation absorbing glass having a luminous transmission under illuminant A of 40 to 60 and more suitably 45 to 55 percent. In another suitable embodiment the set includes: i) a windshield, ii) front side windows, iii) rear side windows; and iv)a rear window, wherein the panels of ii) iii) and iv) all are blue-colored and infrared and ultraviolet radiation absorbing glass. Also at least one of the sets of panels of ii) and iii) have a luminous transmission under illuminant A of 40 to 60, preferably 45 to 55 percent. In addition and at least one of the set of panels of iii) and iv) have a luminous transmission under illuminant A in the range of 20 to 45 percent. A suitable example of such a lower LTA type of privacy glass is a blue colored, privacy, infrared and ultraviolet radiation absorbing glass composition comprising a base glass portion comprising:

| | |
|---|---|
| $SiO_2$ | 66 to 75 percent by weight, |
| $Na_2O$ | 10 to 20 percent by weight, |
| $CaO$ | 5 to 15 percent by weight, |
| $MgO$ | 0 to 5 percent by weight, |
| $Al_2O_3$ | 0 to 5 percent by weight, |
| $K_2O$ | 0 to 5 percent by weight, |

and a primary solar radiation absorbing and colorant portion comprising:

| | |
|---|---|
| total iron | 0.9 to 2 percent by weight, |
| FeO | 0.15 to 0.65 percent by weight, |
| CoO | 90 to 250 PPM, and |
| $TiO_2$ | 0 to 0.9 percent by weight, |

the glass having a luminous transmittance (LTA) of greater than 20% up to 45%, and a color characterized by a dominant wavelength in the range of 479 to 491 nanometers and an excitation purity of at least 4% at a thickness of 0.160 inches.

Also the glass of the present invention can be part o: a laminated transparency comprised of two glass plies bonded together by an interlayer of plastic, such as with a typical windshield construction. Although it should be understood that the invention can apply to transparencies having two plastic plies or any combination involving numerous glass and/or plastic plies or a single (monolithic) ply of glass or plastic. The glass of the present invention could serve as one or more plies of glass in such laminate constructions. Such laminated transparencies could be laminated automotive sidelites or even an automotive sunroofs or even a skylights for commercial or residential construction. Also the ply or plies of a monolithic or laminated structure including the glass that can be annealed as for example with windshields or tempered or heat strengthened, i.e. partially tempered, as for example sidelites. Suitable examples of transparencies that have glass include such glasses as clear glass, float glass, clear or tinted float glass of suitable compositions to enable their production but preferably all of these have a base glass which is a soda lime type of glass with different colorant portions. Examples of the interlayers for such transparencies may be at least one layer of polyvinyl butyral as is commonly used for laminated windshields or any other suitable interlayer material known in the art. Suitable examples of the latter are disclosed in U.S. Pat. No. 4,704, 174, hereby incorporated by reference. For instance the poly(vinylbutyral) interlayers typically can have other polymeric materials like polyurethane and/or plasticizers and/or adhesion promoters like silane coupling agents such as vinyl triethoxy silane (VTES) as more fully described in U.S. Pat. No. 5,028,658 hereby incorporated by reference. Other additives that may optionally be present include: dyes, ultraviolet light stabilizers, adhesion control salts, antioxidants, and treatments from additives to improve laminating efficiency as also noted in U.S. Pat. No. 4,292, 372, hereby incorporated by reference. Also multilayered interlayers can be used where between the layers there is one or more film layers of polyester or similar polymers. Examples of such laminated transparencies include those described in PCT publication 00/73062A1 and U.S. Pat. No. 5,698,053, both of which are hereby incorporated by reference.

As discussed earlier, other materials may also be added to the glass compositions disclosed herein to further reduce infrared and ultraviolet radiation transmission and/or control glass color. In particular, it is contemplated that the following materials may be added to the iron and cobalt, and optionally selenium and/or titanium containing soda-line-silica glass disclosed herein:

| | |
|---|---|
| $Nd_2O_3$ | 0 to 3 wt % |
| $SnO_2$ | 0 to 2 wt % |
| ZnO | 0 to 1 wt % |
| $MoO_3$ | 0 to 0.03 wt % |
| $CeO_2$ | 0 to 2 wt % |
| NiO | 0 to 0.1 wt % |
| $Er_2O_3$ | 0 to 3 wt % |

As should be appreciated, adjustments may have to be made to the basic iron, cobalt, selenium and titanium constituents to account for any coloring and/or redox affecting power of these additional materials.

Other variations as are known to those skilled in the art may be resorted to without departing from the scope of the invention as defined by the claims that follow.

We claim:

1. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, and |
| $K_2O$ | 0 to 5 percent by weight, |

and a primary solar radiation absorbing and colorant portion consisting essentially of:

| | |
|---|---|
| total iron | 0.6 to 2 percent by weight, |
| FeO | 0.15 to 0.65 percent by weight, |
| CoO | 30 to 250 PPM, |
| Se | 1 to 15 PPM, |
| $TiO_2$ | 0 to 0.9 percent by weight, and |
| $Nd_2O_3$ | 0 to 3 percent by weight, |

the glass having a redox in the range of 0.15 to 0.58, wherein at a redox range from 0.15 to 0.4, the range of CoO is from 60 to 250 PPM, and wherein at a redox range greater than 0.4, the CoO is in the range of 30 to 100 PPM, and wherein at a thickness of 0.160 inches, the glass has a luminous transmittance (LTA) of 35% up to 70%; a color characterized by a dominant wavelength in the range of 482 to 487 nanometers and an excitation purity ranging from 8 to 30 percent; a total solar ultraviolet transmittance (TSUV) of 40 percent or less; a total solar infrared transmittance (TSIR) of 25 percent or less; and a total solar energy (TSET) transmittance of 40 percent or less.

2. The composition as in claim 1 wherein the total iron concentration is from greater than 0.9 to 1.3 weight percent.

3. The composition as in claim 2 wherein the total iron concentration is up to 1.1 weight percent.

4. The composition as in claim 1 wherein, the FeO concentration is 0.20 to 0.50 weight percent.

5. The composition as in claim 1 wherein the CoO concentration is 60 to 130 PPM.

6. The composition as in claim 4 wherein the CoO concentration is 60 to 95 PPM.

7. The composition as in claim 1 wherein, the Selenium concentration is up to 12 PPM.

8. The composition as in claim 1 wherein, the $TiO_2$ concentration is 0 to 0.5 weight percent.

9. The composition as in claim 1 wherein the LTA is in the range of 45 to 55 percent.

10. The composition as in claim 1 wherein the composition has a redox of 0.35 to 0.55.

11. The composition as in claim 1 wherein the composition has a redox of 0.20 to 0.35.

12. The composition as in claim 1 wherein the total iron concentration is from 0.9 to 1.3 weight percent, the FeO concentration is 0.20 to 0.35 weight percent, and the CoO concentration is 60 to 90 PPM.

13. The composition as in claim 1 wherein the $TiO_2$ concentration is 0.02 to 0.40 weight percent.

14. The composition as in claim 1 wherein at a thickness of 0.154 inches the glass has a total solar ultraviolet transmittance (TSUV) in the range of 20 to 40 percent, a total solar infrared transmittance (TSIR) in the range of 10 to 35 percent and a total solar energy transmittance (TSET) in the range of 25 to 45 percent or less.

15. The composition as in claim 1 wherein, the Selenium concentration is up to 6 PPM.

16. A flat glass sheet having the glass composition recited in claim 1 formed by a float process.

17. An automotive window formed from the flat glass sheet of claim 16.

18. The composition according to claim 1 wherein Se is in an amount of greater than 6 PPM.

19. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O_3$ | 0 to 5 percent by weight, and |
| $K_2O$ | 0 to 5 percent by weight, |

and a primary solar radiation absorbing and colorant portion consisting essentially of:

| | |
|---|---|
| total iron | 0.6 to 2 percent by weight, |
| FeO | 0.15 to 0.65 percent by weight, |
| CoO | 30 to 250 PPM, |
| Se | 1 to 15 PPM, |
| $TiO_2$ | 0 to 0.9 percent by weight, and |
| $Nd_2O_3$ | 0 to 3 percent by weight, |

the glass having a redox in the range of 0.15 to 0.55, wherein at a redox range from 0.15 to 0.4, the range of CoO is from 60 to 250 PPM, and wherein at a redox range greater than 0.4, the CoO is in the range of 30 to 100 PPM and wherein at a thickness of 0.154 inches the glass has: a luminous transmittance (LTA) of 35% up to 60%, a total solar ultraviolet transmittance (TSUV) of 40 percent or less, a total solar infrared transmittance (TSIR) of 25 percent or less, a total solar energy (TSET) transmittance of 45 percent or less, and a color characterized by a dominant wavelength in the range of 482 to 487 nanometers and an excitation purity ranging from 8 to 20 percent.

20. The composition as in claim 19 wherein the total iron concentration is from 0.9 to 1.3 weight percent, the FeO concentration is 0.20 to 0.50 weight percent, the CoO concentration is 60 to 100 PPM, the Selenium concentration is up to 12 PPM, and the dominant wavelength of the glass is in the range of 479 to 491 nanometers, and the LTA is in the range of 40 to 55 percent.

21. The composition as in claim 19 wherein the CoO concentration is 60 to 95 PPM.

22. The composition as in claim 19 wherein the selenium concentration is up to 6 PPM.

23. The composition as in claim 19 wherein, and the $TiO_2$ concentration is 0 to 0.5 weight percent.

24. The composition as in claim 19 wherein the composition has a redox of 0.15 to 0.35.

25. The composition as in claim 19 wherein at a thickness of 0.154 inches the glass has a total solar ultraviolet transmittance (TSUV) in the range of 20 to 40 percent, a total solar infrared transmittance (TSIR) in the range of 10 to 35 percent and a total solar energy transmittance (TSET) in the range of 25 to 45 percent or less.

26. A flat glass sheet having the glass composition recited in claim 19 formed by a float process.

27. An automotive window formed from the flat glass sheet of claim 26.

28. An automotive transparent glazing panel comprising:

at least one transparent panel selected from side and back transparent panels that is a blue colored, infrared a ultraviolet radiation absorbing glass composition as recited in claim 19.

29. Transparent glass glazing panel set for mounting on an automobile vehicle, comprising:

a windshield, front side windows, rear side windows, and a rear window, wherein at least one of the front side windows, rear side windows; or rear window has the glazing panel of claim 28.

* * * * *